(12) United States Patent
Busch

(10) Patent No.: US 7,708,852 B2
(45) Date of Patent: May 4, 2010

(54) METHOD FOR PRODUCING A BALLISTIC PROTECTIVE ARMOUR

(76) Inventor: Egon Busch, Im Heidkamp 16, Gutersloh (DE) 33334

( * ) Notice: Subject to any disclaimer, the term of this patent is extended or adjusted under 35 U.S.C. 154(b) by 319 days.

(21) Appl. No.: 11/815,281

(22) PCT Filed: Feb. 4, 2005

(86) PCT No.: PCT/EP2005/001147

§ 371 (c)(1),
(2), (4) Date: Aug. 1, 2007

(87) PCT Pub. No.: WO2006/081834

PCT Pub. Date: Aug. 10, 2006

(65) Prior Publication Data

US 2008/0142151 A1    Jun. 19, 2008

(51) Int. Cl.
| | |
|---|---|
| B32B 7/08 | (2006.01) |
| B29C 51/16 | (2006.01) |
| B29C 65/00 | (2006.01) |
| B32B 37/00 | (2006.01) |
| F41H 1/04 | (2006.01) |
| B29C 70/44 | (2006.01) |
| B27N 3/18 | (2006.01) |
| B29C 41/46 | (2006.01) |
| B29C 43/02 | (2006.01) |
| B29C 43/32 | (2006.01) |
| B29C 51/00 | (2006.01) |
| B28B 3/00 | (2006.01) |
| B28B 3/02 | (2006.01) |

(52) U.S. Cl. .................. 156/93; 156/212; 156/228; 2/6.6; 264/258; 264/319

(58) Field of Classification Search .................. 156/60, 156/91, 92, 93, 148, 196, 211, 212, 213, 156/214, 228, 242, 245, 250, 303.1, 307.1, 156/307.3, 307.4, 307.7, 311, 312, 443, 445, 156/580, 581, 583.1; 2/2.5, 6.6, 6.7, 6.8, 2/410, 455, 456; 264/134, 135, 136, 137, 264/258, 324

See application file for complete search history.

(56) References Cited

U.S. PATENT DOCUMENTS 3,841,954 A * 10/1974 Lawler ................. 428/102

(Continued)

FOREIGN PATENT DOCUMENTS

DE    19944475 A1    4/2000

(Continued)

*Primary Examiner*—Richard Crispino
*Assistant Examiner*—Brian R Slawski
(74) *Attorney, Agent, or Firm*—Richard M. Goldberg

(57) ABSTRACT

A method for producing a ballistic protective armour includes superimposing a certain number of textile layers (116) in such a way that a layer structure (114) is formed, in sewing the textile layers (116) of the layer structure to each other and in pressing the layer structure (114). Prior to a sewing process, the textile layers (116) of the layer structure (114) are pre-pressed by a pre-pressing process (30) in such a way that a preform (130), whose three-dimensional shape corresponds to a final product shape, is formed and subsequently, after the sewing process (50), the preform is exposed to a heat-pressing process (100) at a temperature greater than the temperature of the pre-pressing process (30).

18 Claims, 8 Drawing Sheets

U.S. PATENT DOCUMENTS

| | | | |
|---|---|---|---|
| 3,956,447 A * | 5/1976 | Denommee et al. | 264/135 |
| 4,199,388 A | 4/1980 | Tracy et al. | |
| 4,550,044 A * | 10/1985 | Rosenberg et al. | 428/101 |
| 4,822,439 A * | 4/1989 | Gauchel et al. | 156/285 |
| 4,842,923 A * | 6/1989 | Hartman | 428/219 |
| 4,953,234 A * | 9/1990 | Li et al. | 2/412 |
| 5,512,348 A * | 4/1996 | Mazelsky | 428/102 |
| 5,545,455 A * | 8/1996 | Prevorsek et al. | 428/76 |
| 5,591,933 A * | 1/1997 | Li et al. | 89/36.02 |
| 5,857,215 A * | 1/1999 | Fergason et al. | 2/8.3 |
| 5,874,151 A * | 2/1999 | Cohee et al. | 428/102 |
| 6,276,100 B1 | 8/2001 | Woll et al. | |

FOREIGN PATENT DOCUMENTS

| | | | |
|---|---|---|---|
| WO | WO 03/074962 | * | 9/2003 |
| WO | WO 2004/029538 | * | 4/2004 |

\* cited by examiner

METHOD FOR PRODUCING A BALLISTIC PROTECTIVE ARMOUR

BACKGROUND OF THE INVENTION

The present invention relates to a method for producing a ballistic protective armour according to the premeable of claim 1.

Ballistic protective armours are known as components of ballistic protective clothing in a number of different embodiments, as, for example, military helmets protecting against projectile impacts and shell splinters, as flak jackets and suchlike. For producing a protective armour of this kind, single textile layers made of highly durable fabrics are layered onto each other to form a layered structure. The textile layers of this layered structure are sewed together and subjected to a pressing step to form a laminate. A protective armour of this kind is known, for example, from the patent document U.S. Pat. No. 3,841,954 and serves in the case described in this document as a back-side reinforcement of another armouring layer, so that a high stability against the impact of a splinter is achieved.

The compactness and and rigidity of the layered structure can be improved by sewing so that the protective effect of the armouring is improved. Moreover it is known to form ballistic protective armours from laminated textile layers which absorb the energy of a striking projectile to a large extent. This is achieved by a deformation of the projectile which penetrates the outer layers of the laminate, the deformed projectile being intercepted by the remaining layers at the inner side of the armour which is to be protected, because the kinetic energy is already strongly reduced after destroying the outer layers. These remaining catching layers delaminate in parts from the penetrated outer layers so that an inward bulge is formed at the inner side of the protective armour, in which the projectile remains. Because an extensive bulging effect can lead to strong injuries of the wearer of the ballistic protective armour, for example, to severe head injuries of the wearer of a military protective helmet which is built that way, it is possible to delimit the peeling or delamination effect of the catching layers by providing seams. Thus it is possible to provide a protective armour made of a textile laminate which absorbs an impact sufficiently on one hand and keeps the person to be protected from suffering injuries on the other hand.

To ensure a wearing comfort which is as high as possible as well as an extensive protective effect, the ballistic protective armour should be adapted to the body form of its wearer. It is therefore desired to produce the armour in a large variety of different forms. This is not always achievable without problems because the inner structure of the relatively rigid textile laminate can be changed by a subsequent bending, bulging, deep drawing or the like in a way that the protective effect may be impaired all over the whole product or locally. In particular it is disadvantageous if a covering which is coated to the textile layers for forming the laminate penetrates too deep into the fibers, because the fabric of the textile layers and the yarn of the seams shall keep well-defined properties with respect to elasticity and tensile strength. For example, the protective armour disclosed by U.S. Pat. No. 3,841,954 is bendable to a certain extent after sewing and subsequent pressing, but it is not spherically deformable, for example, to a hemisphere. So it is not possible to form helmet shells by that way.

SUMMARY OF THE INVENTION

It is therefore an object of the present invention to provide a method for producing a ballistic protective armour of the above kind which makes it possible to produce protective armours in a broader variety of forms as it used to be possible according to the state of the art, without imparing its protective properties. In particular it is an object of the present invention to permit the production of helmet shells made of a coated textile material comprising textile layers which are sewed and pressed together.

This object is achieved by a method according to claim 1.

According to the present invention, the textile layers of the layered structure are pre-pressed to a preform before sewing, the shape of the preform corresponding to the end product to be produced, for example, the desired spherical form. Subsequently the textile layers of this pre-pressed preform are sewed with each other. The production process is finished by a hot pressing step at a higher temperature than during the pre-pressing step. While the pre-pressing step generally serves to bring the layered structure into the desired shape before sewing, the layers are densified to form the desired laminate with high rigidity. By this step the produced ballistic protective armour also obtains its stiffness.

One advantage of the method according to the present invention lies in the fact that the shape of the end product is already present before sewing, and the final hot pressing does not cause a considerable change of the shape of the product. The preform is not bent or bulged after sewing so that it keeps its structure during the hot pressing step. Therefore the structure of the fabric of the textile layers is obtained as well as the tensile properties of the yarn which is used for sewing, so that the tensile strength and elasticity are maintained sufficient for generally keeping the cohesion of the laminate at the impact of a projectile into the protective armour.

Preferred embodiments of the present invention are disclosed in the subclaims. Preferably a method for producing the helmet shell of a ballistic protective helmet is claimed.

BRIEF DESCRIPTION OF THE DRAWINGS

In the following a preferred embodiment of the present invention is explained with respect to the following drawings.

DETAILED DESCRIPTION

Figure 1:
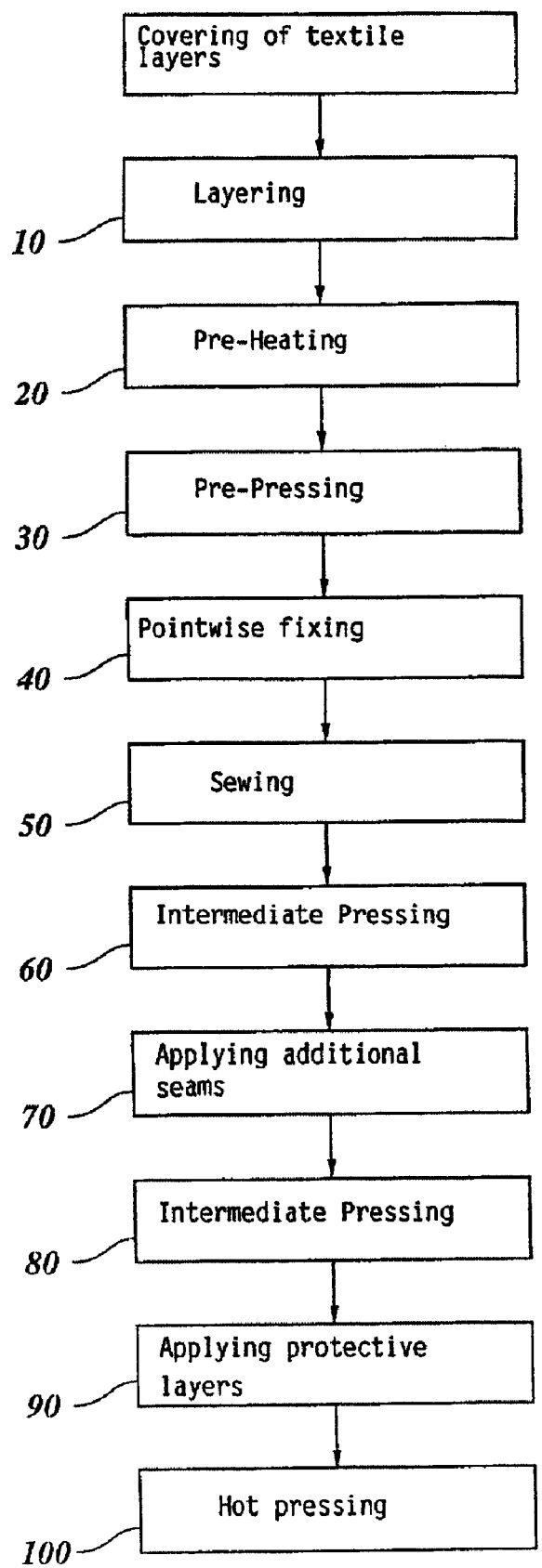
FIG. 1 is a flow diagram representing schematically a preferred embodiment of the method according to the present invention.

In the following the production of a spherically convex ballistic protective armour shall be described by way of example, which shall serve as the helmet shell of a ballistic protective helmet. As a basic material are textile layers being woven of a yarn with high strength or technical fibers like, for example, aramid, high molecular polyethylene or the like, said textile layers being covered on one side by a connecting agent like, for example, resin, plastic or an adhesive agent.

This can be achieved by applying a resin coating which attaches to the surface of the fabric when heated without penetrating the fibers. During hot pressing, a laminate connection of the textile layers with each other is formed, wherein the connecting agent penetrates the textile layers partially but only as far as the elasticity and flexibility of the fibers of the fabric is maintained. Therefore, the textile layers can absorb the kinetic energy of an impacting projectile to a certain extent.

A preparation step of the method according to the present invention can be the preparation of single textile blanks by covering them with a connection agent like, for example, a resin, plastic or adhesive agent. The blanks of the textile layers, which are shown in FIGS. 10a to 10j by way of example, are first layered in a predetermined order onto each other in a step marked by reference number 10 in FIG. 1. Some of the blanks are provided with radial insections which allow to give the layer a vaulted shape by overlapping of surface areas to allow further processing to an almost spherical shape.

Because the covered textile layers usually have a high rigidity, the step of layering 10 to form a layer structure can be carried out in a mold which also serves as a pre-heating mold. Because the number of used textile layers can be large, it may be helpful to fix the layer structure for example by fasteners at the rim of the pre-heating mold. In a pre-heating step 20, the textile layers are heated and lay against each other and on top of the pre-heating mold 110, which preferably has the general shape of the end product to be produced.

After the pre-heating step 20, the layered structure is pre-pressed in a cold state in a pre-pressing step to produce a preform with a shape corresponding to the end product to be produced. The textile layers of this preform can be fixed to each other pointwise by fasteners or the like (step 40) after the pre-pressing step 30 to keep their coherence. In the following step 50 the textile layers of the preform are sewed together. The sewing step can be followed by an intermediate pressing step 60, after which additional seams for reinforcing critical zones of the ballistic protective armour can be applied (step 70). After a second intermediate pressing step 80, the completely sewed preform can be provided with a protective layer on its inner surface and/or on its outer surface (step 90). At last the sewed preform is pressed together with its protective layers in a hot pressing step 100 to connect its textile layers by the applied connecting agent to form a laminate. The ballistic protective helmet which is formed by this procedure is kept together by the cohesion of the laminate of the textile layers on one hand and additionally by the seams which are applied in the sewing steps 50 and 70 on the other hand.

The method steps shown in FIG. 1 are explained in the following with respect to FIGS. 2 to 9.

Figure 2:
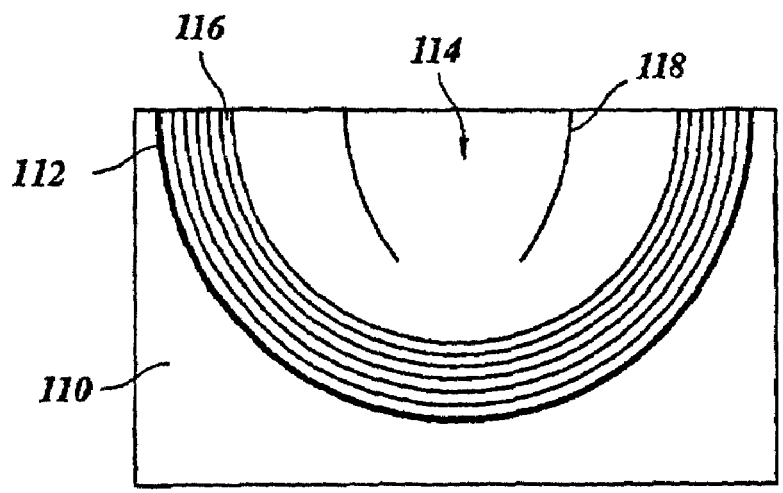
FIGS. 2 to 9 are schematic views of single method steps from FIG. 1.

FIG. 2 is a schematic section through a pre-heating mold 110, the inner surface 112 of this pre-heating mold 110 being formed hemispherically for receiving a layered structure 114 of textile layers. Each of these textile layers, one of them being provided with the reference number 116 in FIG. 2, consists of yarns or fibers with high tensile strength like, for example, high molecular polyethylene, aramid or the like and is covered by a connecting agent like resin, plastics or adhesive agent on one of its sides in a preparation step. This textile layer material has usually a certain stiffness, so that it is preferably pre-heated within a pre-heating mold 110 before being further processed. To this purpose the step of layering the textile layers 116 marked by reference number 10 in FIG. 1 can be carried out in the pre-heating mold 110 itself. Radial insections 118 in the layer blanks facilitate the matching to the pre-heating mold 110. The layered structure 114 formed this way can temporarily be fixed in or at the mold to prevent the textile layers 116 from being shifted against each other.

Figure 3:
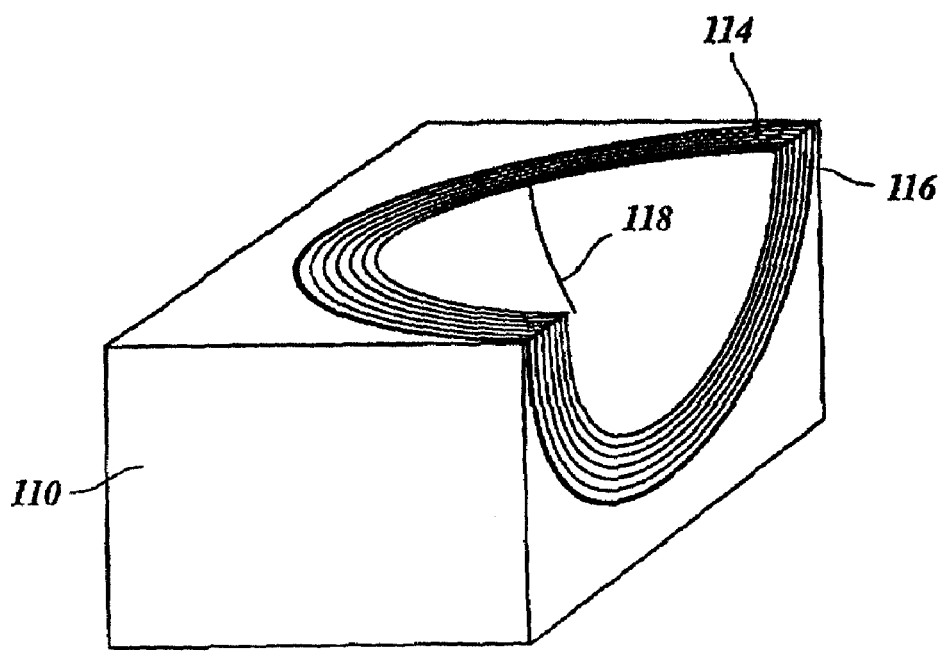

When the pre-heating mold 110 or its inner surface 112 is heated in a suitable way, the textile layers 116 of the layered structure 114 lay against the hemispherical inner surface 112 because of the heating of the material of the textile layers and the coated connecting agent, making the layers flexible. The pre-heating is preferably carried out at a temperature of the pre-heating mold 110 of 60° C. In the ideal case the single textile layers 116 lie flat on each other after the pre-heating step 20 so that the layered structure 114 takes a hemispherical form. FIG. 3 shows the pre-heating mold 110 in a lateral section from a perspective view, comprising the layered structure 114.

Figure 4:
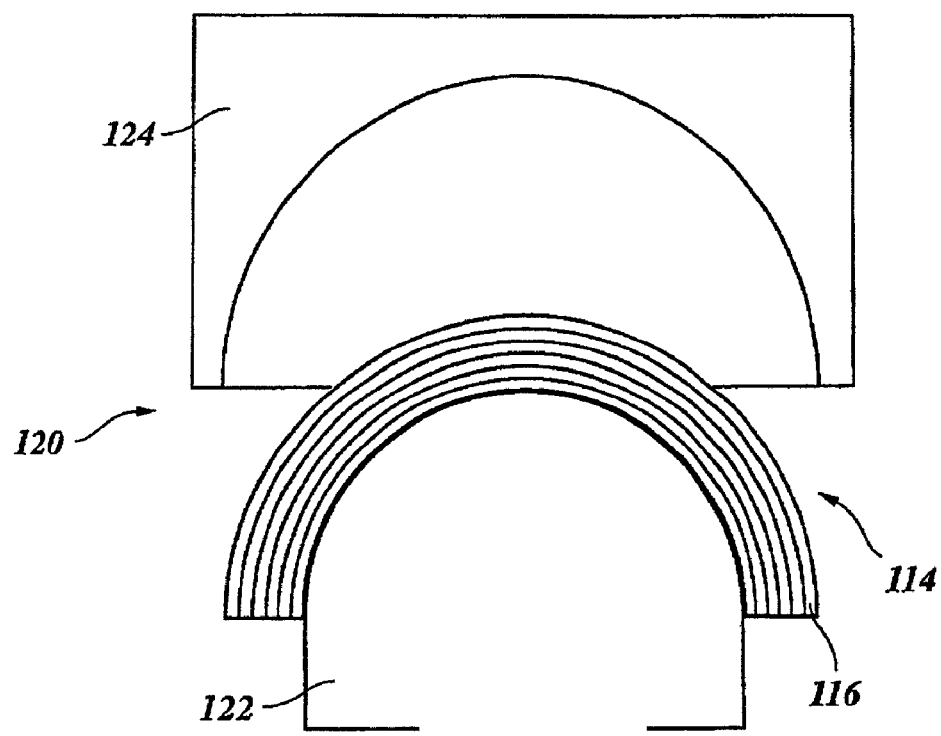
Figure 5:
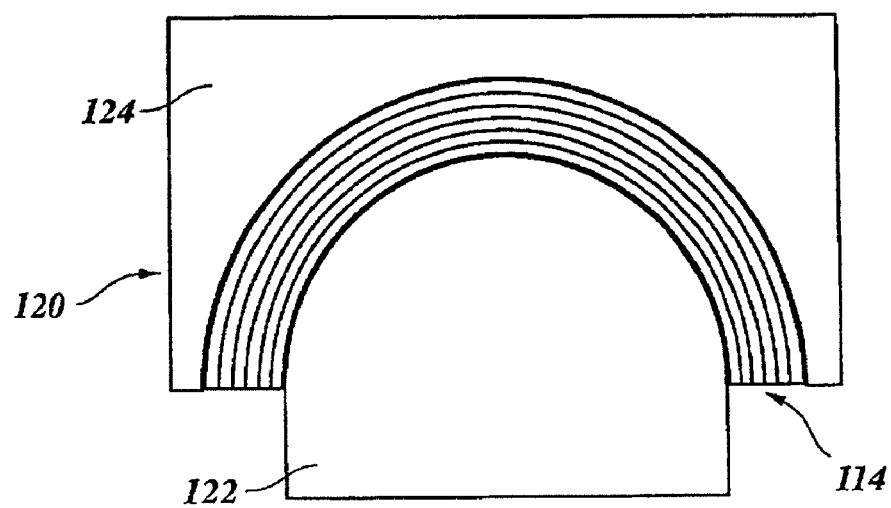

After the pre-heating the hemispherical layered structure 114 is transferred into a cold press 120, like it is shown in FIG. 4. The cold press 120 comprises a hemispherical lower mold half 122 on which the layered structure 114 is laid with its concave inner side, as well as a concave upper hemispherical mold half 124 which is provided to be lowered onto the lower mold half 122 in a way that it encloses the outside of the layered structure 114, as shown in FIG. 5. In this state the layered structure 114 comprising the textile layers 116 is pre-pressed in a cold state (method step 30 in FIG. 1). In this pressing step, pressure and temperature must be chosen to form an interstage product with a relatively compact packing of layers in which the layers do not dissolve from each other automatically. The pre-pressing can be carried out at room temperature with a pressure of 150 kg/cm².

Figure 6:
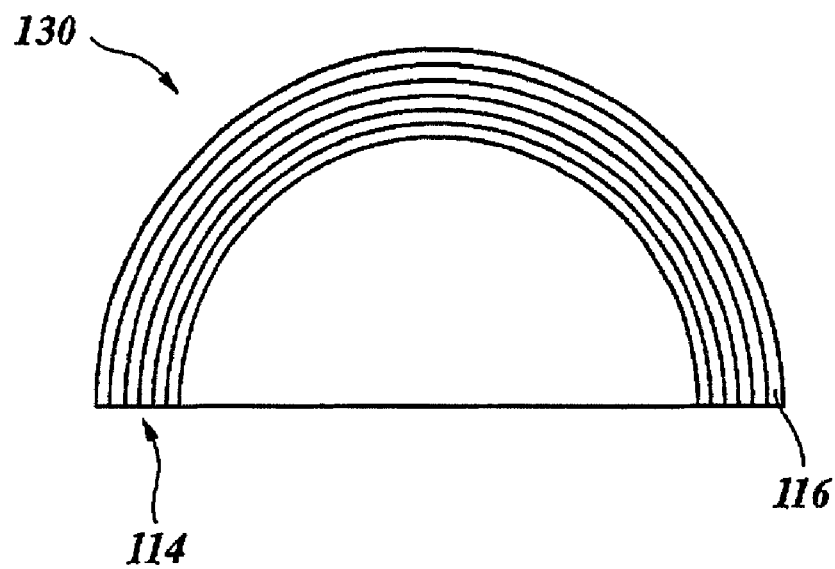

The preform 130 shown in FIG. 6, which is produced by the pre-pressing step 30, already comprises the shape of the ballistic protective armour to be produced, which is the desired form of the helmet shell in the example described here. However, it acquires its final protective properties by further method steps which are explained in the following.

Figure 7:
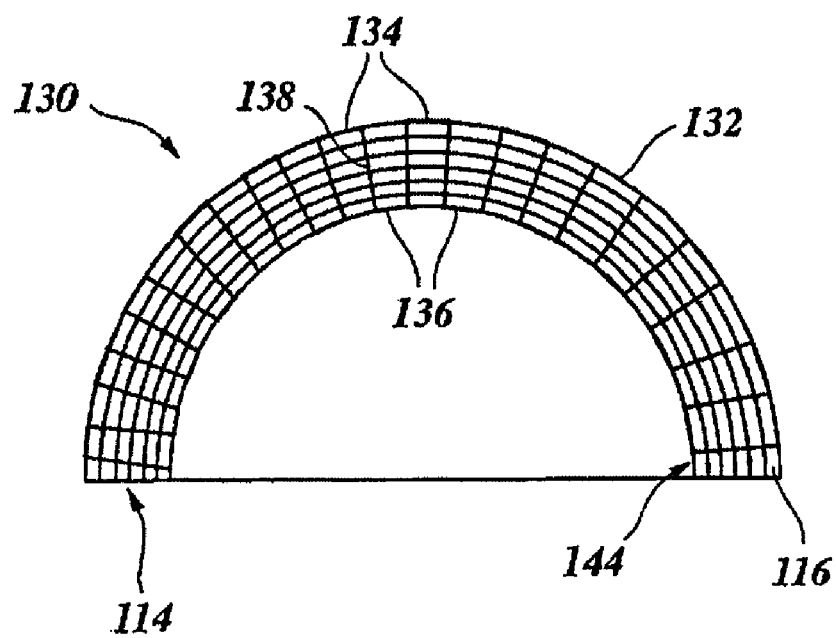

The single textile layers 116 of the preform 130 can be locally fixed against each other before further processing (method step 40 in FIG. 1), like, for example, by pointwise attaching of connectors like cramps or the like, which are shot into the layered structure 114 at different positions. These connectors are not shown in FIG. 6 for the sake of simplicity. The preform 130 from FIG. 6 is subsequently sewed, like it is schematically shown in FIG. 7 (method step 50 in FIG. 1). For this purpose a preform 130, which is pre-pressed and fixed pointwise, where necessary, is provided with seams by a sewing machine, keeping the single textile layers 116 of the layered structure 114 together. FIG. 7 shows a meandering seam 132 running in portions on the inner side as well as on the outside of the preform 130, and the portions 134 and 136 running on the inside, and on the outside are connected by portions 138 of the seam 132 extending radially with reference to the hemisphere of the preform 130, i. e., in the layering direction, ensuring the cohesion of the textile layers 116. The stitch pattern of the seam 132 is shown simplified in FIG. 6 and can be more complex. The sewing method can be adapted arbitrarily to the desired protective properties of the ballistic protective helmet to be produced. The yarn of the seam 132 is chosen such that it comprises a high tensile strength as well as a certain elasticity, to prevent a large number of yarn portions 138 from being sheared in the layering direction to the inside. It is advantageous when the yarn 132 can absorbe a large part of the energy of the projectile and is stretched that way. A partial delamination of the inner textile layers 116 of the layers structure 114 is accepted in a certain extent.

Figure 11:
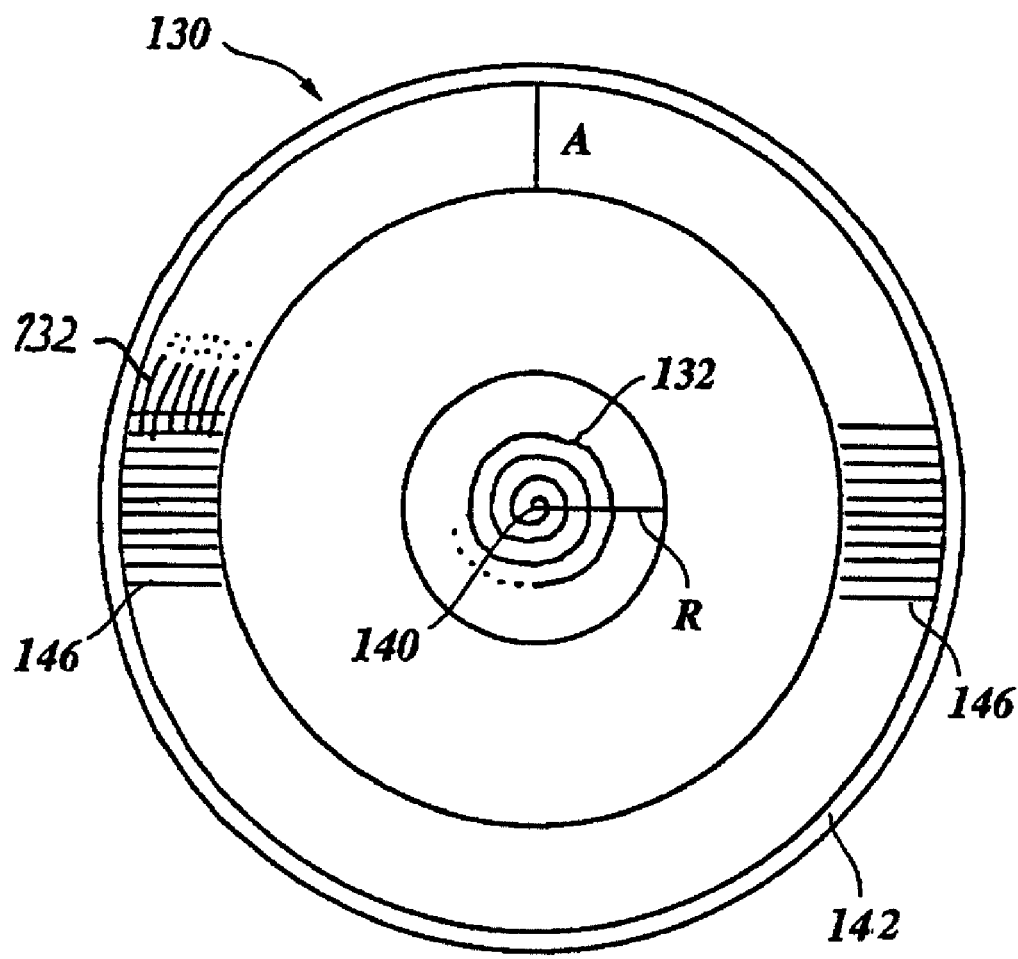
FIG. 11 is a view of the end product produced by the method according to the present invention from below.

The course of the seam 132 can be chosen in a way that the seam winds spirally from the center 140 of the area of the hemisphere of the preform 130 around this center 140 to the rim 142 of the hemisphere, like it is additionally shown in FIG. 11, showing a top view onto the inner surface 144 of the preform 130. For the sake of simplicity, only a part of the spiral form of the course of the seam 132 is shown, and it goes without saying that the seam 132 continues its course to the rim. The spiral course of the seam 132 simplifies the processing because it is easy to hold the preform 130 in the sewing machine and to rotate it in this position. The radial pitch of the seam 132 can be varied. Generally speaking, the cohesion of the layered structure 114 is improved by a higher density of the seams. Considering the pitch of the seams, the elasticity and tensile strength of the yarn of the seam 132 and of the textile layers 116 and the proportion of the connection agent in the layered structure 114 (for example, the resin content), the protective properties of the end product can be varied to achieve a sufficient resistance against perforation and to permit a delamination of the inner textile layers of the layered structure 114 by a penetrating projectile only in a small extent. If, for example, the resin content of the layered structure 114 is low to decrease the weight of the protective armour, the delamination effect of the inner layers 116 is promoted. However, this can be balanced by decreasing the pitch of the seams. The seam 132 is an additional component which allows a decreasing of the resin content without impairing the protective effect.

In a circular area R around the surface center point 140 of the hemisphere of the preform 130, the pitch of the seams in the radial direction may be 6 mm, for example, while it increases to 10 mm outside of this area R. In a strip-like rim portion A extending in the circumferential direction of the preform 130 along its rim 142 it can decrease again to be 6 mm.

After sewing 50 a preform 130 can be subjected to an intermediate pressing step (method step 60 in FIG. 1) to give the layered structure 114 of the preform 130 an even stronger coherence. After this intermediate pressing step 60, additional seams 146 can be attached in certain portions of the preform 130, which cross the spiral seam 132 and reinforce areas of the ballistic protective helmet to be produced which are especially endangered, like, for example, the ear portions. After attaching these additional seams (method step 70), a second intermediate pressing step can be carried out (step 80). Consequently, an intermediate pressing step 60,80 can be carried out after each sewing step 50,70.

Figure 8:
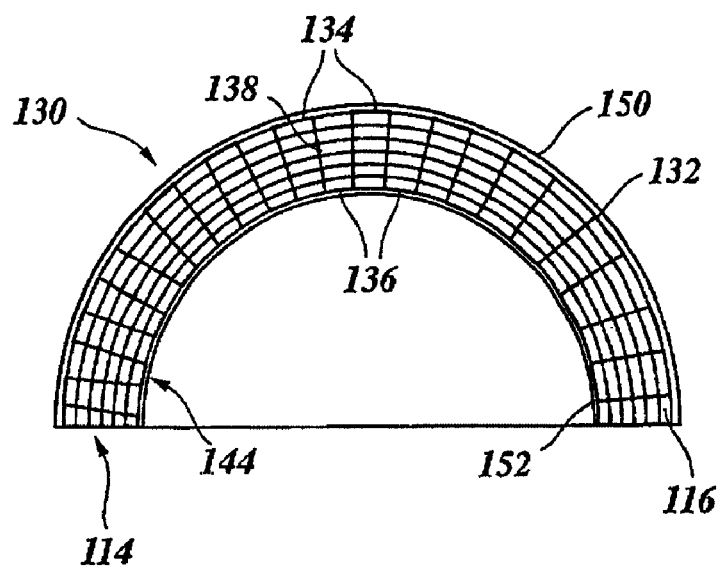

After sewing the preform 130 completely, protective layers are applied on its inside and on its outside to fix the seams 132,146 at their portions 134,136 which are exposed on the surfaces, protecting these portions for being damaged. The outer protective layer is a textile layer being covered on both sides with the connection agent, which is resin, plastics or adhesive agent, said textile layer consisting of the same or a similar material like the layers 116 which have already been sewed together. This outer textile layer 150 is laminated layer-like onto the preform 130 while the opposed inner side 144 of the preform 130 is only coated with the connection agent covering also the textile layers 116 and 150. This means that a layer 152 of resin, plastics or adhesive agent is applied to the hemispherical inside 144 of the preform 130 and protects and fixes the inner portions 136 of the yarn 132 so that the preform 130 is protected on both of its opposing surfaces, and when the textile layer structure 114 is damaged, the yarn 132 cannot slip partly out of the sewing channels. This method step of applying the protective layers 150,152 (step 90 in FIG. 1) is shown in FIG. 8.

Figure 9:
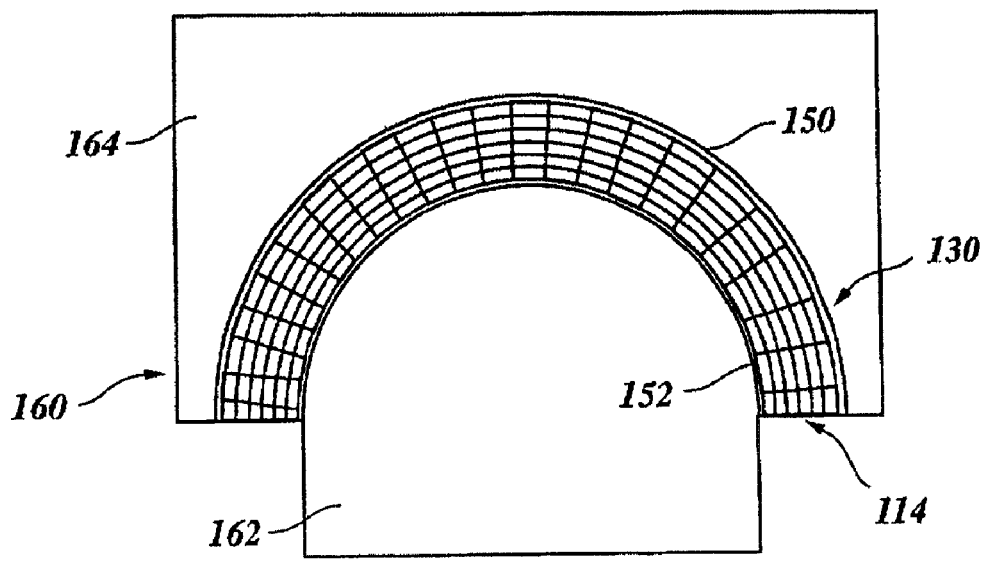
Figure 10A:
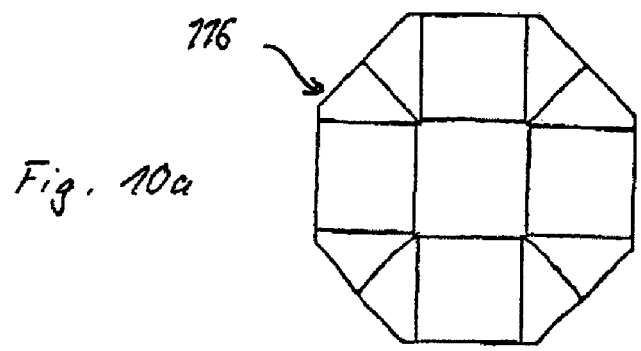
FIGS. 10a to 10j are plan views of examples of blanks of textile layers for forming the layered structure.
Figure 10B:
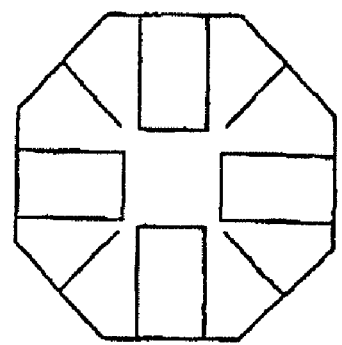
Figure 10C:
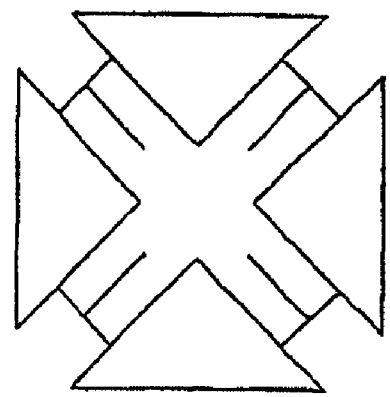
Figure 10D:
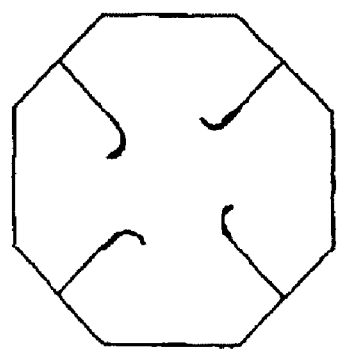
Figure 10E:
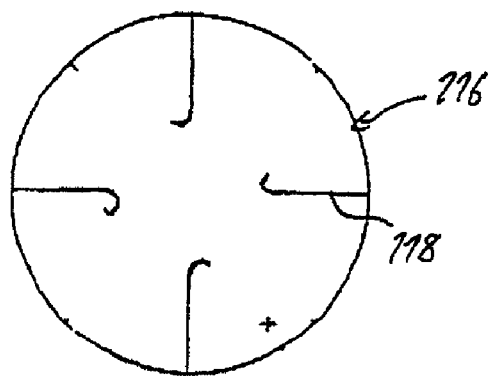
Figure 10F:
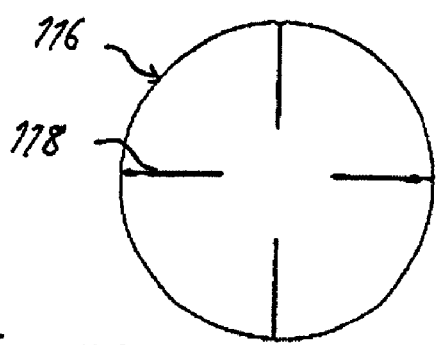
Figure 10G:
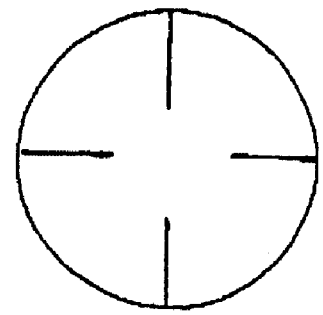
Figure 10H:
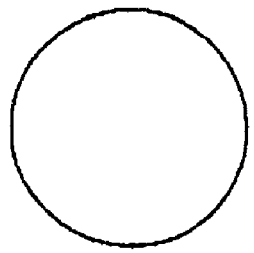
Figure 10I:
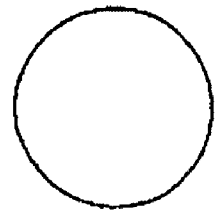
Figure 10J:
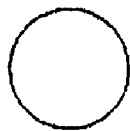

Finally, the preform 130 being provided with the protective layers 150 and 152 is subjected to a hot pressing step shown in FIG. 9. For this purpose the coated preform 130 is brought into a hot press 160 in a way that the preform 130 is put with its concave inside onto a corresponding lower mold half 162 while a hemispherical concave upper mold half 164 is provided to be lowered vertically onto the lower mold half 162. The hot pressing (step 100 in FIG. 1) is carried out preferably at a temperature between 150° C. and 175° C. and at a pressure of 200 kg/cm$^2$, which are higher pressure and temperature values than at the pre-pressing and intermediate pressing steps 30,60,80. During hot pressing, the coating of the connecting agent of the single textile layers 116 partially penetrates the fabric and forms a connection matrix by which the textile layers 116 are connected with each other to form a laminate. During this process the layered structure 114 of the preform 130 can be slightly compressed without changing the shape of the preform 130. The outer protective textile layer 150 and the inner protective layer 152 become parts of this laminate as well and form a solid connection with the sewed layered structure 114 of the preform 130.

The spherical shape of the preform 130 is not changed by the hot pressing step 100. Consequently there is no danger that the configuration of the layer structure 114 already defined by the hot pressing 30 and the sewing 50,70 is deteriorated. This means that the final shape of the end product to be produced is already created by the pre-pressing 30 during the production of the preform 130, and the sewing 50,70 is carried out at an intermediate product which has already the desired shape. This is an important advantage over known methods by which a layer structure is defined by sewing and subsequent pre-pressing in a plane, while the deformation of the laminate is carried out afterwards.

After the hot pressing step 100 in FIG. 9, the ballistic protective helmet can be taken out as the end product and can be subjected to final working steps, like, for example, polishing the rims, attaching rim protection elements, painting the upper side, adapting a suitable lining for the inner portion of the helmet shell and so forth.

The invention claimed is:

1. Method for producing a ballistic protective armor comprising the following steps:
    layering a number of textile layers onto each other to form a layered structure,
    sewing the textile layers of the layered structure together, and
    pressing the layered structure, including the steps of:
        pre-pressing the textile layers of the layered structure in a cold press comprising a lower hemispherical mold half and an upper hemispherical mold half before sewing in a pre-pressing step to form a hemispherical preform with a shape corresponding to an end product to be produced, and
        hot pressing said preform in a hot pressing step after sewing its textile layers, at a higher temperature than at the pre-pressing step.

2. Method according to claim 1, wherein the temperature during the hot pressing step lies in the range between 150° C. and 175° C.

3. Method according to claim 1, wherein the pressing during the hot pressing step is performed with a higher pressure than during the pre-pressing step.

4. Method according to claim 1, wherein the pressure during the hot pressing step is 200 kg/cm$^2$.

5. Method according to claim 1, wherein the pressure during the pre-pressing step is 150 kg/cm$^2$.

6. Method according to claim 1, further comprising the step of covering single ones of the textile layers before being layered onto each other by a connecting agent, said connecting agent forming a connection matrix for connecting the textile layers to form a laminate during the hot pressing step.

7. Method according to claim 1, further comprising the step of preheating the layered structure before the pre-pressing step inside a pre-heating mold.

8. Method according to claim 7, wherein the temperature of the pre-heating mold is 60° C.

9. Method according to claim 1, further comprising the step of fixing pointwise the textile layers of the preform with each other after the pre-pressing step and before the sewing step.

10. Method according to claim 1, further comprising the step of providing the preform with a protective layer at least on one of its surfaces after sewing of its textile layers and before the hot pressing step.

11. Method according to claim 10, further comprising the step of forming the protective layer with an additional textile layer which is covered at least on one of its surfaces with a connecting agent and which is attached on an outer surface of the preform.

12. Method according to claim 10, further comprising the step of coating the preform on an inner surface thereof with a connecting agent for forming said protective layer.

13. Method according to claim 10, further comprising the step of subjecting the preform to an intermediate pressing step after sewing of its textile layers and before attaching the protective layer.

14. Method according to claim 13, wherein the intermediate pressing step is carried out at a lower temperature than during the hot-pressing step.

15. Method according to claim 1, further comprising the step of attaching, during sewing of the textile layers of the hemispherical preform, a seam starting from a center of the surface of the preform and winding helically around said center to a rim of the hemispherical preform.

16. Method according to claim 15, further comprising the step of attaching additional seams after attaching the helical seam, said additional seams crossing the helical seam.

17. Method according to claim 16, further comprising the step of subjecting the preform to an intermediate pressing step between attaching the helical seam and attaching the additional seams.

18. Method according to 6, wherein the connecting agent includes a material selected from the group consisting of a resin, a plastic and an adhesive agent.

\* \* \* \* \*